United States Patent
Townsend

(10) Patent No.: US 9,763,375 B2
(45) Date of Patent: Sep. 19, 2017

(54) METHOD OF EVALUATING ACCUMULATORS OF PLANTER DOWNFORCE SYSTEM

(71) Applicant: Ag Leader Technology, Ames, IA (US)

(72) Inventor: Kurt Townsend, Ames, IA (US)

(73) Assignee: Ag Leader Technology, Inc., Ames, IA (US)

( * ) Notice: Subject to any disclaimer, the term of this patent is extended or adjusted under 35 U.S.C. 154(b) by 84 days.

(21) Appl. No.: 14/798,048

(22) Filed: Jul. 13, 2015

(65) Prior Publication Data

US 2017/0013771 A1  Jan. 19, 2017

(51) Int. Cl.
| | | |
|---|---|---|
| *A01B 63/10* | (2006.01) | |
| *A01B 61/04* | (2006.01) | |
| *F15B 1/04* | (2006.01) | |
| *G01L 19/12* | (2006.01) | |

(52) U.S. Cl.
CPC .............. *A01B 61/046* (2013.01); *F15B 1/04* (2013.01); *G01L 19/12* (2013.01)

(58) Field of Classification Search
CPC ...... A01B 61/046; A01B 61/048; A01B 63/10
USPC ............................................ 172/1, 663, 668
See application file for complete search history.

(56) References Cited

U.S. PATENT DOCUMENTS

| | | | |
|---|---|---|---|
| 6,758,096 B1 | 7/2004 | Schon | |
| 7,673,570 B1* | 3/2010 | Bassett | A01B 61/046 |
| | | | 111/140 |
| 8,448,717 B2* | 5/2013 | Adams | A01C 7/203 |
| | | | 111/135 |
| 8,522,889 B2* | 9/2013 | Adams | A01C 7/203 |
| | | | 111/136 |
| 8,544,398 B2* | 10/2013 | Bassett | A01C 7/205 |
| | | | 111/135 |
| 8,550,020 B2* | 10/2013 | Sauder | F15B 11/042 |
| | | | 111/195 |
| 8,661,875 B2 | 3/2014 | Zhou | |
| 8,763,713 B2* | 7/2014 | Bassett | A01C 5/06 |
| | | | 111/135 |
| 9,192,089 B2* | 11/2015 | Bassett | A01C 7/205 |
| 2008/0093093 A1* | 4/2008 | Sheppard | A01B 61/046 |
| | | | 172/2 |
| 2011/0264339 A1 | 10/2011 | Wang et al. | |

* cited by examiner

*Primary Examiner* — Gary Hartmann
(74) *Attorney, Agent, or Firm* — McKee, Voorhees & Sease, PLC

(57) ABSTRACT

A planter downforce system includes a plurality of hydraulic accumulators. Each of the plurality of hydraulic accumulators is operatively connected to a pressure line associated with a row unit of a planter. A pressure sensor is operatively connected to the pressure line. An orifice is operatively connected to the pressure line to limit flow of fluid within the pressure line to a hydraulic zero-pressure tank. A controller is operatively connected to the pressure sensor and configured to determine accumulator charge pressure of the accumulators.

5 Claims, 7 Drawing Sheets

METHOD OF EVALUATING ACCUMULATORS OF PLANTER DOWNFORCE SYSTEM

FIELD OF THE INVENTION

The present invention relates to planters. More particularly, but not exclusively, the present invention relates to evaluating accumulators attached to actuators within a downforce system used on a planter.

BACKGROUND OF THE ART

Down force may be applied to one or more row units on a planter in order to provide greater control over planting depth. In order to apply down force, hydraulic actuators may be used. Hydraulic accumulators may be operatively connected to the hydraulic actuators in order to accumulate energy and smooth out adjustments in down force applied by the hydraulic actuators.

Despite the benefits of using a down force system on a planter, problems remain. One problem relates to the charging of the accumulators. The accumulators lose charge over time and need to be re-charged and/or serviced so as not to adversely impact performance. However, there is a problem in determining the charge level of the accumulators in a down force system. Thus, it is uncertain as to when re-charging or service needs to occur and when it is not needed. What is needed is a method and system for evaluating the charge levels of accumulators in a planter down force system.

SUMMARY OF THE INVENTION

Therefore, it is a primary object, feature, or advantage of the present invention to improve over the state of the art.

It is a further object, feature, or advantage of the present invention to provide for determining the charge level of the accumulators within a down force system of a planter.

It is a still further object, feature, or advantage of the present invention to provide for notifying an operator that an accumulator within a down force system of a planter needs to be recharged or otherwise serviced.

One or more of these and/or other objects, features, or advantages will become apparent from the specification and claims that follow. No single embodiment need include each and every object, feature, or advantage. Different embodiments may have different objects, features, or advantages.

According to one aspect, a planter downforce system includes a plurality of hydraulic accumulators, each of the plurality of hydraulic accumulators operatively connected to a pressure line associated with a row unit of a planter, a pressure sensor operatively connected to the pressure line, an orifice operatively connected to the pressure line to limit flow of fluid within the pressure line to a hydraulic zero-pressure tank, and a controller operatively connected to the pressure sensor and configured to determine accumulator charge for the accumulators.

According to another aspect, a method for determining accumulator charge of hydraulic accumulators used in a planter downforce system is provided. The method includes increasing channel pressure to a maximum pressure for a plurality of channels fluidly connected to a pressure line, each of the channels associated with one of the hydraulic accumulators of the planter downforce system, delaying for a time sufficient to allow the hydraulic accumulators to fill with fluid, turning off a hydraulic selectable control valve, bleeding the pressure line through an orifice dumping fluid to a fluid tank, pushing fluid back through the down force control valve thereby dumping the fluid to the fluid tank via the orifice, and determining pressure with a pressure sensor prior to pressure dropping.

DETAILED DESCRIPTION OF THE PREFERRED EMBODIMENT

Figure 1:
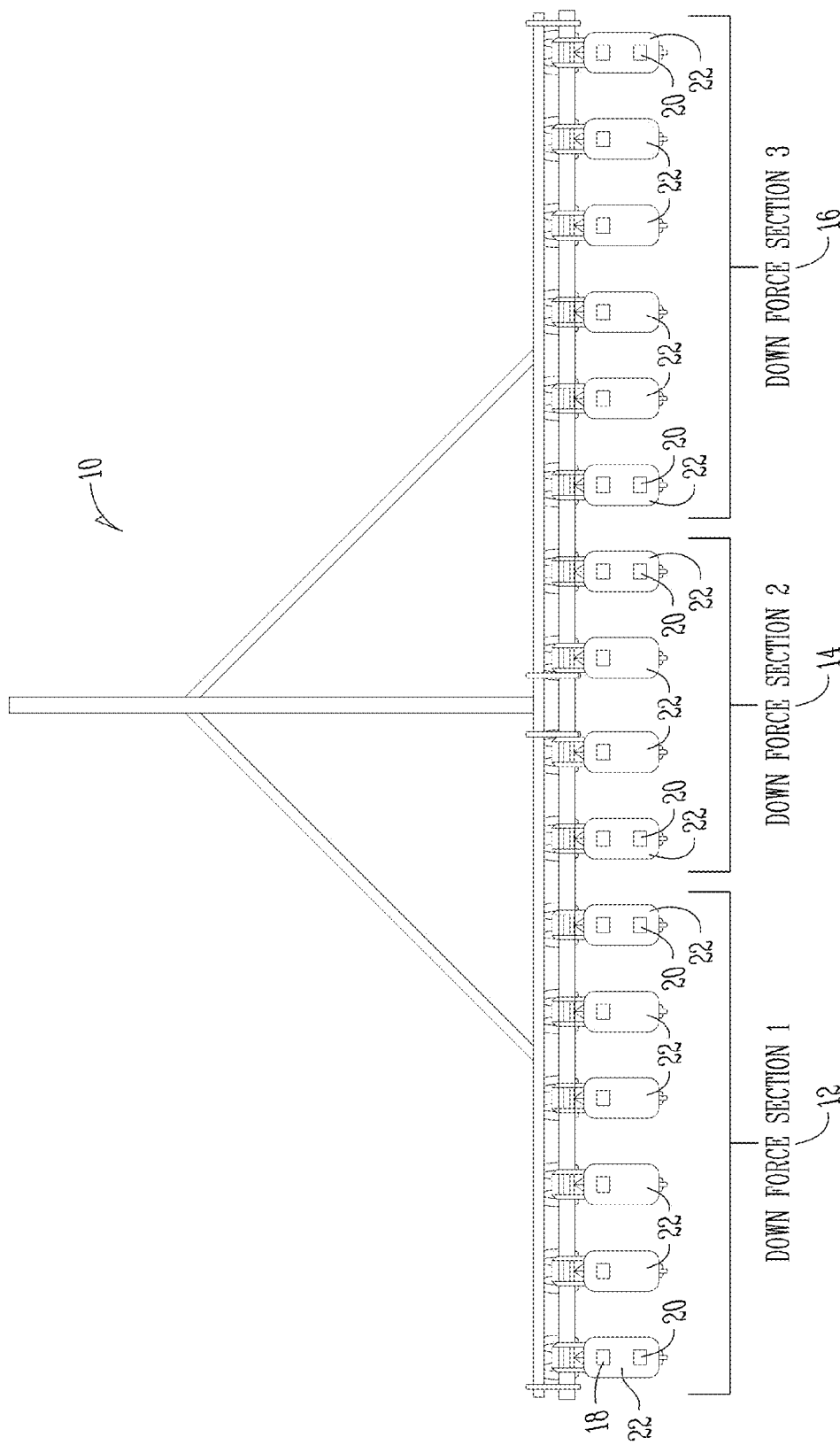
FIG. 1 illustrates a planter having a downforce system with accumulators which are under evaluation according to one aspect of the present invention.

FIG. 1 illustrates one example of a planter or seeder implement 10. The planter 10 includes three sections of down force control, including a first section 12, a second section 14, and a third section 16. Each control section 12, 14, 16, has two down force sensors 20 preferably on opposite ends of the section. As shown in FIG. 1 there is a 16 row planter with 16 row units 22 and each row unit has a down force actuator 18. The outer down force sections, which are the first section 12 and the third section 16 each have six row units 22 while the middle or second down force section 14 includes four row units 22. Although a planter with multiple down force sections of varying sizes is shown, it is to be understood that planters with any number of row units may be used and that there need not be different sections present or that one section per row may be used.

Figure 2:
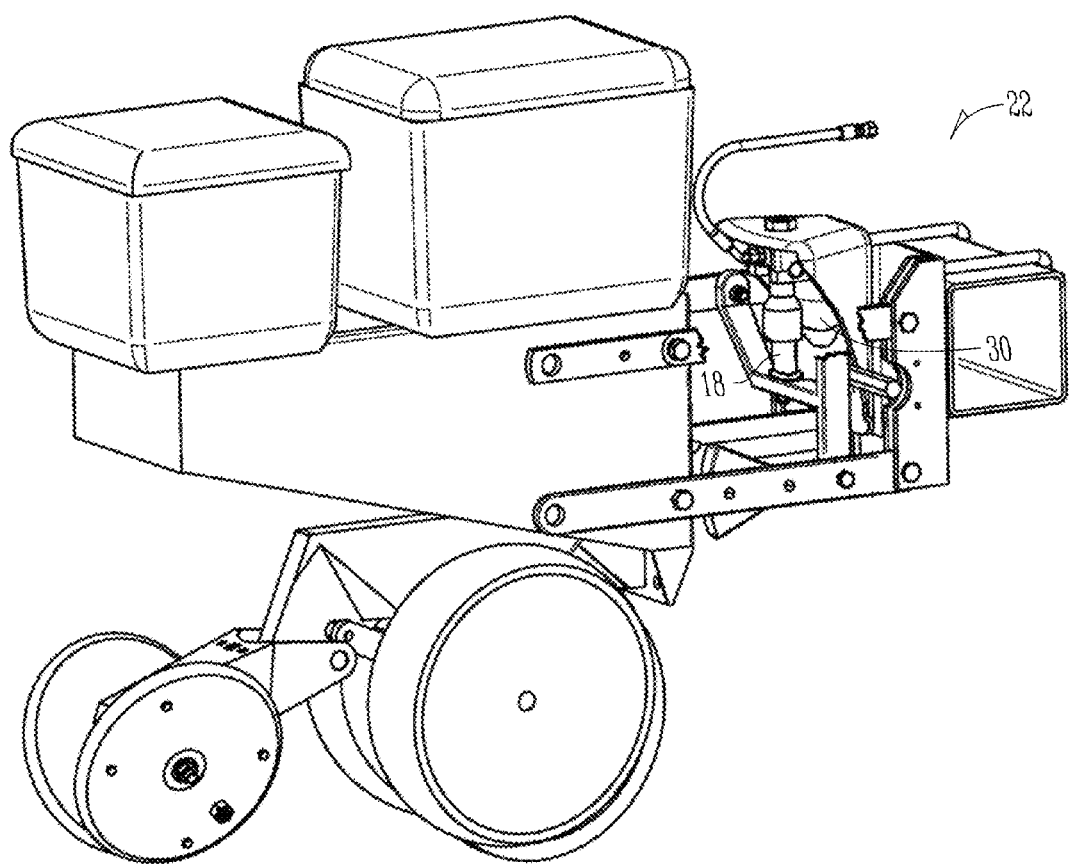
FIG. 2 illustrates a hydraulic accumulator installed on a row unit of a planter.

FIG. 2 illustrates a hydraulic accumulator 30 installed on a row unit of the planter of FIG. 1. An actuator 18 is attached to or otherwise operatively connected with the accumulator 30. The accumulator 30 may be a gas pre-charged hydraulic accumulator.

Figure 3:
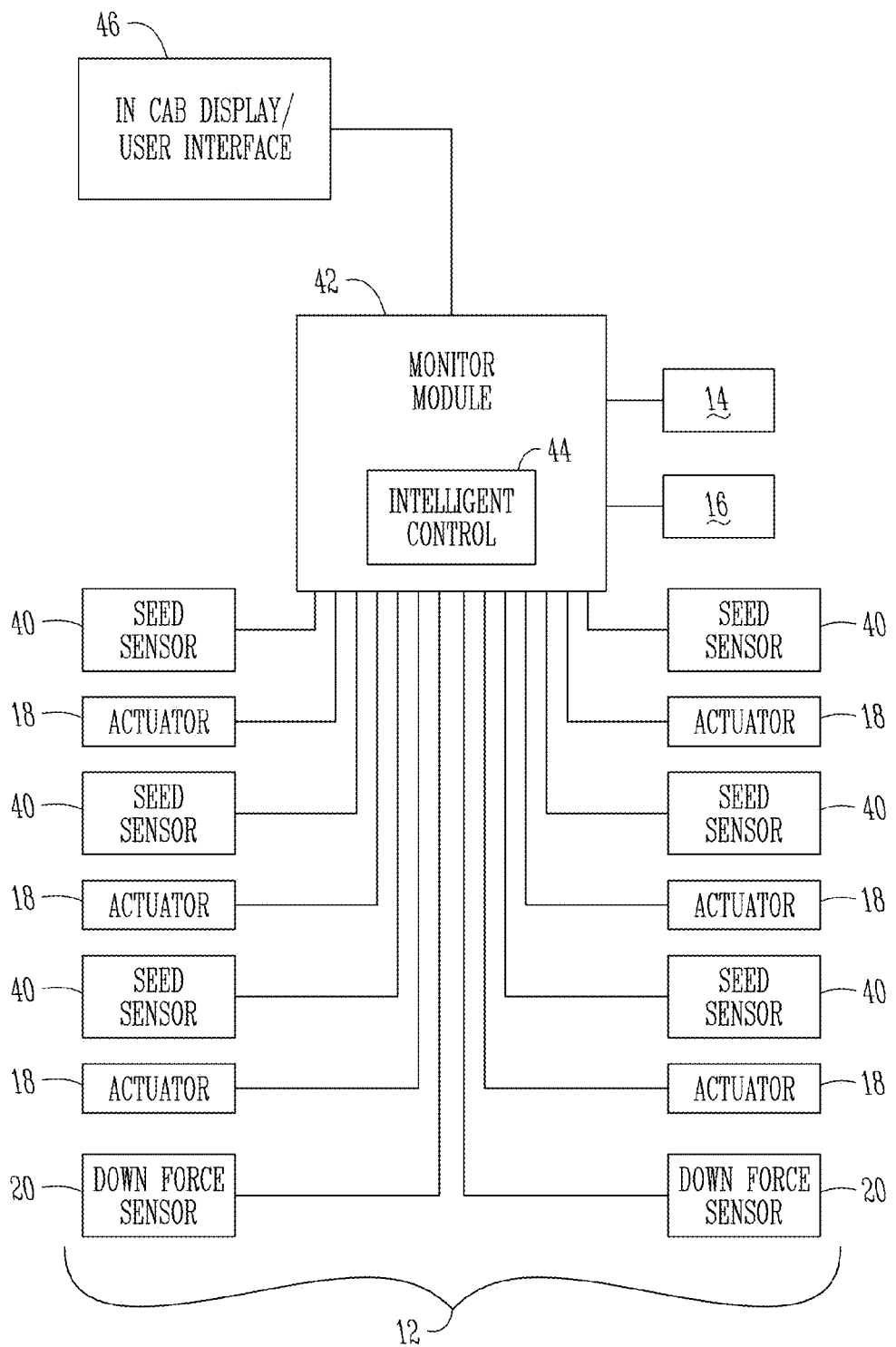
FIG. 3 illustrates a control system.

FIG. 3 illustrates the control system in additional detail. As shown in FIG. 3, a monitor module 42 includes an intelligent control 44 such as a processor, microcontroller, or other type of intelligent control. The monitor module 42 may provide for monitoring a plurality of different seed sensors 40 which are electrically connected to the monitor module 42 to sense that seeds are planted. In addition, the monitor module 42 may be electrically connected or otherwise operatively connected to the down force sensors 20 for each section 12, 14, 16 and actuators 18 for each row unit. The actuators 18 provide for pushing down on the row unit relative to the frame of the seeder implement 10 in a manner determined in part from signals sensed by the down force sensor 20. As previously explained, the accumulators may be used to smooth transitions. In addition, an in-cab display 46 may be electrically connected to the monitor module 42. The in-cab display/user interface may be used to display information related to the down force sensing. This can include information such as whether or not a down force section is in a plant zone or a no plant zone. In addition, the in-cab display 46 may be a touchscreen display or may provide for manual inputs or other user inputs which allow an operator to select settings or options. The monitor module 42 may also be configured for determining the charge level of the accumulators and the in cab display 46 may be configured to allow an operator to view the charge level of the accumulators.

Figure 4:
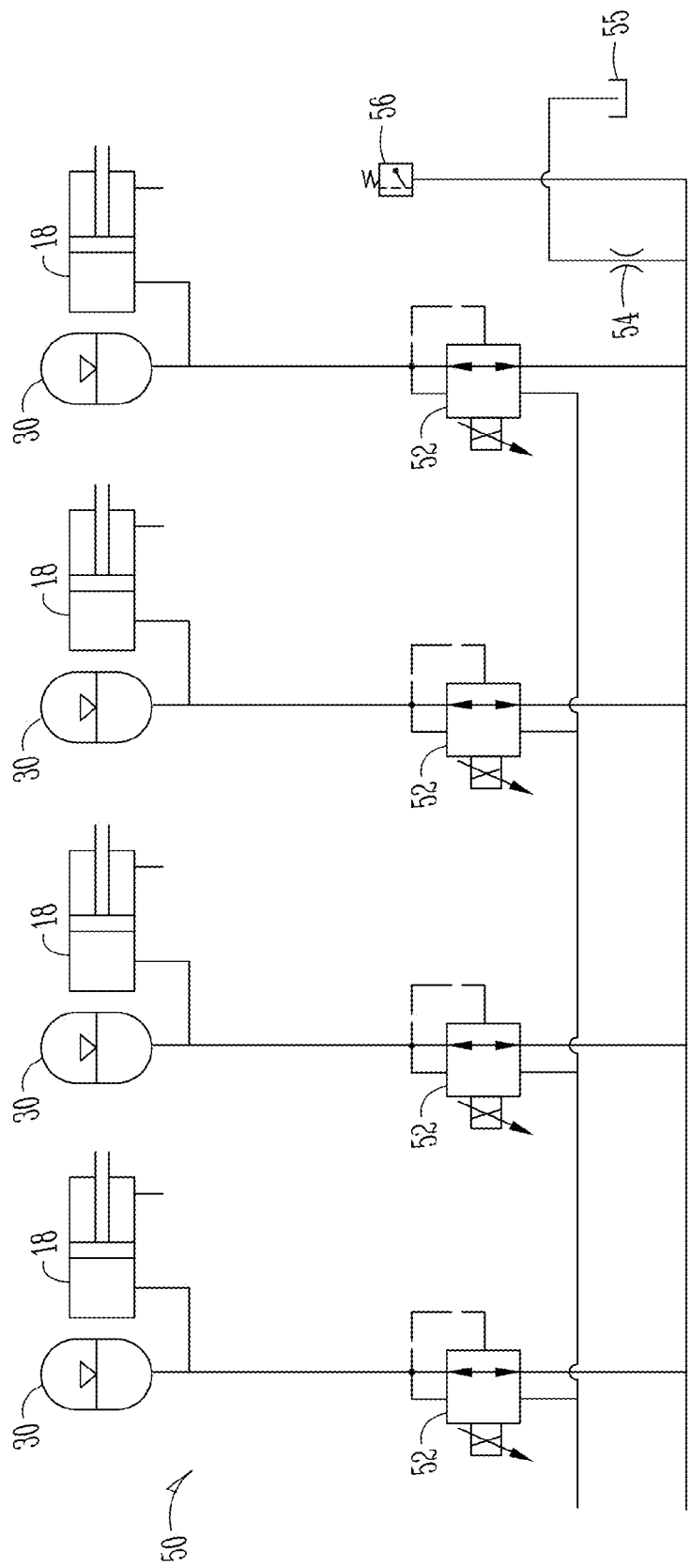
FIG. 4 illustrates a hydraulic circuit.

FIG. 4 illustrates one example of a hydraulic circuit 50 with four control sections. As shown in FIG. 4, in each section there is an accumulator 30 which is fluidly connected to an actuator or cylinder 18. A down force control valve 52 is also fluidly connected to each accumulator 30 and actuator 18. A line restriction such as an orifice 54 is shown which is positioned along the line to zero-pressure tank 55. A pressure sensor 56 is also shown.

Figure 5:
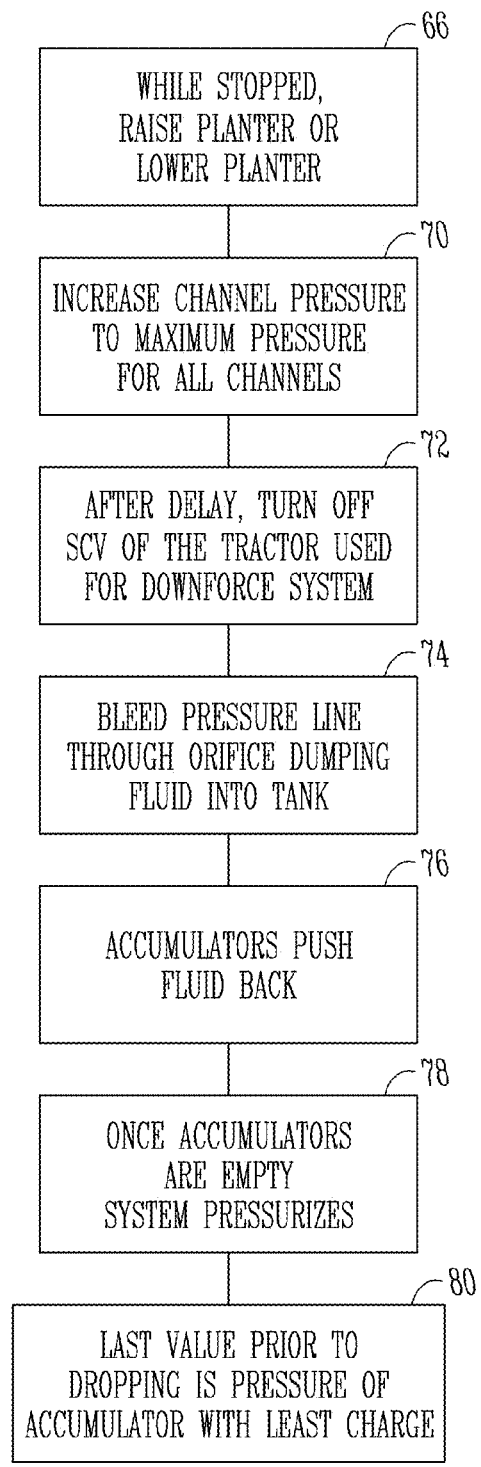
FIG. 5 is a flow diagram illustrating one example of a methodology of the present invention.

FIG. 5 illustrates one example of a methodology for determining the health of accumulators. In step 66, while completely stopped, the planter is either raised or lowered so down force system hydraulic pressure is constant. In step 70 channel pressure is increased to maximum pressure for all channels. Next, in step 72, after a delay (e.g. about a minute or other amount of time sufficient to allow the accumulators to fill), the selectable control valve (SCV) of the tractor which is used for the down force system is turned off thus blocking flow to the down system through the hydraulic pressure and return lines. Next, in step 74, the pressure line will proceed to bleed through the orifice, dumping the fluid to zero-pressure tank. In step 76, the accumulators via charge pressure, start pushing the pressurized fluid back through each down force control valve, dumping the fluid to zero-pressure tank via the orifice. This process may take some time due to the size of the orifice being small (e.g. about a minute). As shown in step 78, once the accumulator charge pressure equalizes to the down force system pressure (as sensed with the pressure transducer), the hydraulic system pressure falls at a very fast rate or instantaneously to zero. As shown in step 80, the last value prior to the system pressure dropping to zero is the value of the pressure of the accumulator with the least charge. If the value of the pressure of the accumulator with the least charge is below a predetermined value then the user or customer may be notified that an accumulator recharge is recommended or else other appropriate action may be taken.

Figure 6:
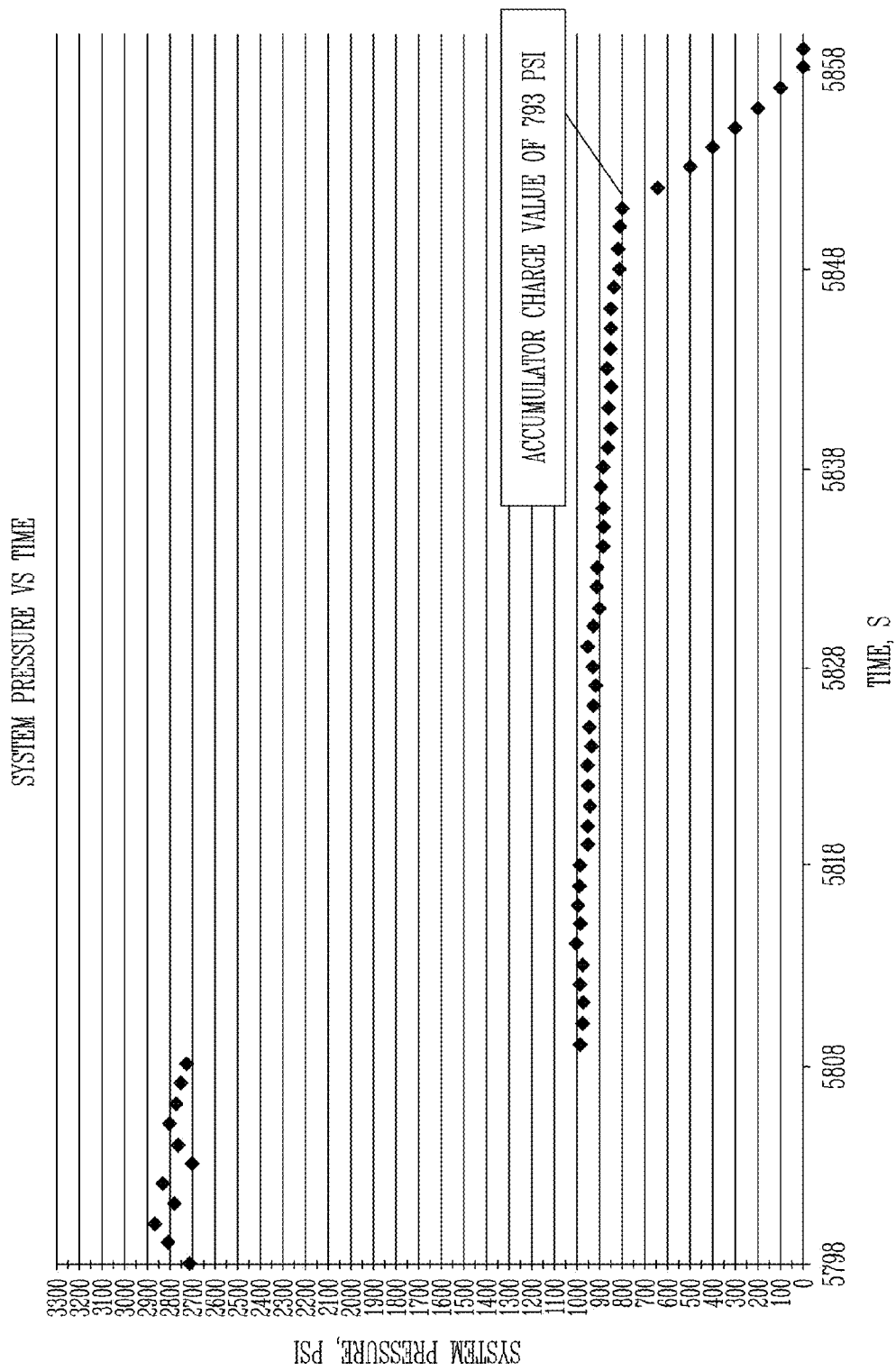
FIG. 6 is diagram illustrating system pressure over time.

FIG. 6 illustrates system pressure over time. Note that initially, the system pressure remains high with channel pressure increased to maximum pressure for a time period. Then, the tractor SCV is turned off, reducing the down force system pressure. After the down force system pressure is bled to tank, there is a very fast decrease in pressure. Note that the accumulator charge value is revealed immediately prior to the dramatic decrease in pressure.

Figure 7:
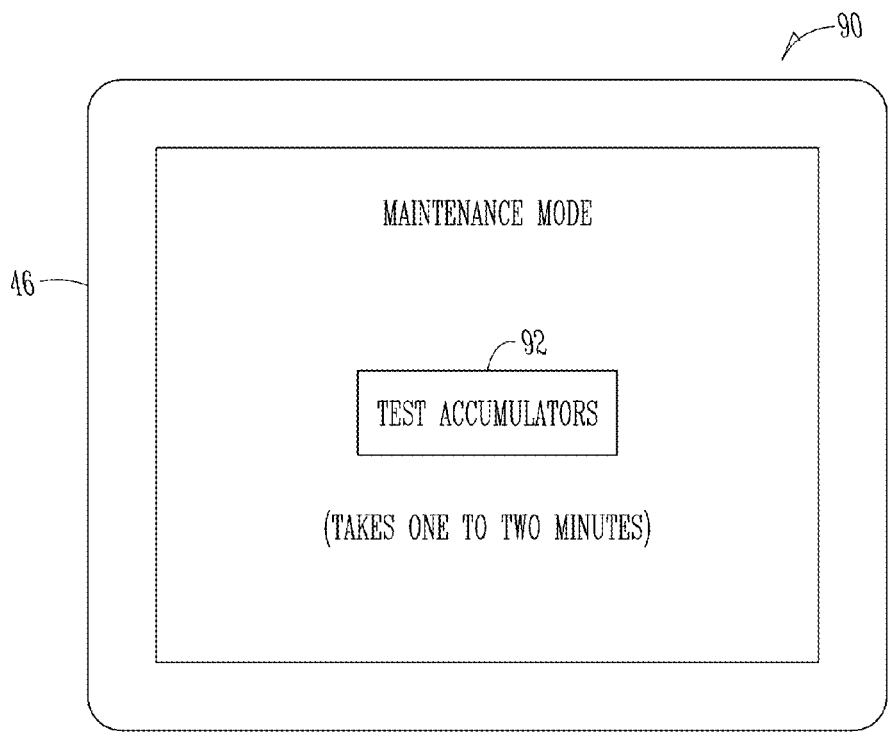
FIG. 7 is an illustration of a display with user interface according to one aspect of the invention.

It is contemplated that a maintenance or test mode may be used to assist the operator in determining either the accumulator charge pressure or whether recharging is recommended. In such an instance the test mode may be provided through software control. FIG. 7 illustrates an example of a screen display 90 which may be displayed on the in-cab display 46. The screen display 90 allows an operator to select a user input such as a soft button 92 on the in-cab display 46 to test the accumulators. The operator may be alerted that the process to test the accumulators may take several minutes to perform. Additional instructions may be provided to the operator prior to the process, during the process, or after the process. It is contemplated that the operator may choose to enter the maintenance or test mode on their own. In addition, or alternatively, the system may provide an alert or message periodically to suggest that the operator enter the maintenance or test mode.

Figure 8:
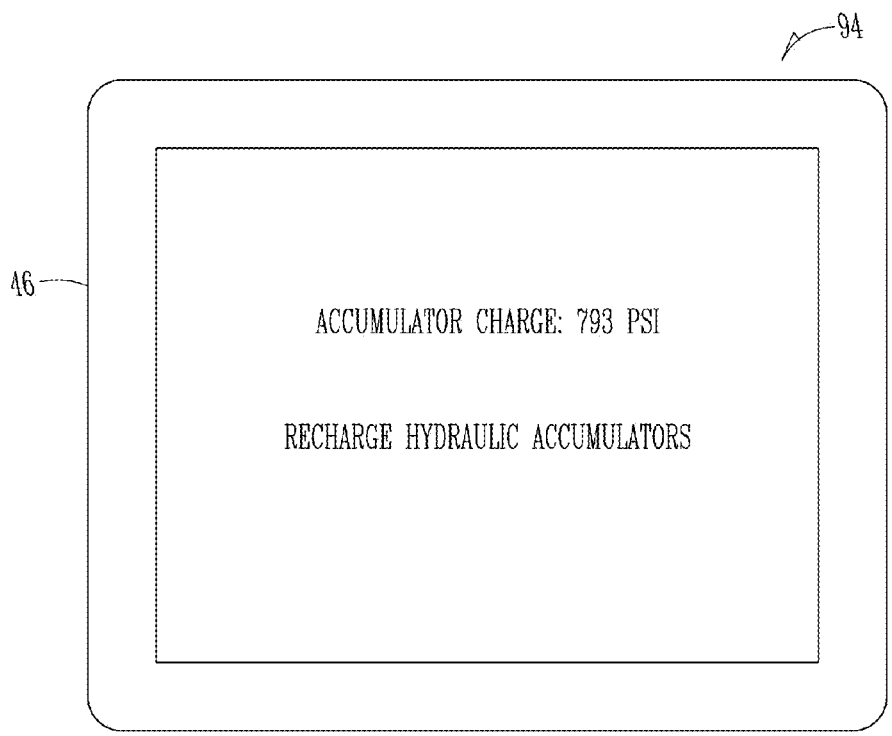
FIG. 8 is the display and user interface of FIG. 7 showing different information.

FIG. 8 illustrates an example of a screen display 94 which may be displayed on the in-cab display 46 after the conclusion of a testing cycle. The screen display 94 may display the current accumulator charge as well as a notification or message that the hydraulic accumulators should be recharged, is required, or is otherwise desirable. Such a message may be displayed or otherwise communicated when the measured value falls below a threshold value. Alternatively, a message may be displayed or otherwise communicated indicating that the hydraulic accumulators are operating within normal parameters.

Therefore a planter downforce system and related apparatus and methods have been described and shown. The present invention is not to be limited to the specific embodiments shown or described herein as numerous options, variations, and alternatives are contemplated.

What is claimed is:

1. A method for determining accumulator charge of hydraulic accumulators used in a planter downforce system, the method comprising:
   increasing channel pressure to a maximum pressure for a plurality of channels fluidly connected to the pressure line, each of the channels associated with one of the hydraulic accumulators;
   delaying for a time sufficient to allow the hydraulic accumulators to fill with fluid;
   turning off the tractor hydraulic selectable control valve dedicated to down force;
   bleeding the pressure line through the orifice dumping fluid to the hydraulic tank;
   accumulators, via charge pressure, pushing fluid back through the down force control valve thereby dumping the fluid to the hydraulic zero-pressure tank via the orifice; and
   determining pressure with the pressure sensor immediately prior to down force system pressure dropping.

2. The method of claim 1 further comprising communicating the pressure from the pressure sensor to a processor.

3. The method of claim 2 further comprising displaying a message on a display operatively connected to the processor, the message indicative of the pressure.

4. The method of claim 2 further comprising displaying a message on a display operatively connected to the processor, the message indicative of whether or not one or more hydraulic accumulators should be maintenanced.

5. The method of claim 2 further comprising displaying a message on a display operatively connected to the processor, the message indicative of whether or not to recharge one or more of the hydraulic accumulators.

* * * * *